(12) United States Patent
Yamaguchi (10) Patent No.: US 9,290,235 B2
(45) Date of Patent: Mar. 22, 2016

(54) BICYCLE DERAILLEUR

(71) Applicant: Shimano Inc., Sakai, Osaka (JP)

(72) Inventor: Sota Yamaguchi, Osaka (JP)

(73) Assignee: Shimano Inc., Osaka (JP)

( * ) Notice: Subject to any disclaimer, the term of this patent is extended or adjusted under 35 U.S.C. 154(b) by 187 days.

(21) Appl. No.: 13/920,318

(22) Filed: Jun. 18, 2013

(65) Prior Publication Data

US 2014/0371013 A1    Dec. 18, 2014

(51) Int. Cl.
*B62M 9/124* (2010.01)
*B62M 9/126* (2010.01)
*B62M 9/16* (2006.01)
*B62M 9/1244* (2010.01)
*B62M 9/1248* (2010.01)

(52) U.S. Cl.
CPC .............. *B62M 9/124* (2013.01); *B62M 9/126* (2013.01); *B62M 9/1244* (2013.01); *B62M 9/1248* (2013.01); *B62M 9/16* (2013.01)

(58) Field of Classification Search
CPC ...... B62M 9/121; B62M 9/125; B62M 9/126; B62M 9/1244; B62M 9/1248; F16H 7/12; F16H 7/1272; F16H 2007/081
USPC ..................................................... 474/80, 82
See application file for complete search history.

(56) References Cited

U.S. PATENT DOCUMENTS

| 4,392,840 | A | * | 7/1983 | Radocaj | 474/117 |
| 4,406,643 | A | * | 9/1983 | Shimano | 474/82 |
| 4,583,962 | A | * | 4/1986 | Bytzek et al. | 474/133 |
| 4,626,229 | A | * | 12/1986 | Nagano | 474/80 |
| 4,692,131 | A | * | 9/1987 | Nagano | 474/80 |
| 4,834,694 | A | * | 5/1989 | Martin | 474/135 |
| 4,923,435 | A | * | 5/1990 | Kadota et al. | 474/112 |
| 5,052,982 | A | * | 10/1991 | Ouchi | 474/135 |
| 6,059,679 | A | * | 5/2000 | Tsutsui et al. | 474/135 |
| 6,135,904 | A | | 10/2000 | Guthrie | |
| 6,264,578 | B1 | * | 7/2001 | Ayukawa | 474/135 |
| 6,394,921 | B1 | * | 5/2002 | Fukuda | 474/80 |
| 6,945,888 | B2 | | 9/2005 | Fukuda et al. | |
| 6,949,040 | B2 | | 9/2005 | Ando | |
| 7,572,199 | B1 | * | 8/2009 | Calendrille, Jr. | 474/80 |
| 7,803,078 | B2 | * | 9/2010 | D'Silva et al. | 474/117 |
| 7,980,974 | B2 | | 7/2011 | Fukuda | |

(Continued)

FOREIGN PATENT DOCUMENTS

| EP | 1 415 902 | A2 | 5/2004 |
| EP | 2 128 014 | A1 | 12/2009 |

*Primary Examiner* — William E Dondero
*Assistant Examiner* — Minh Truong
(74) *Attorney, Agent, or Firm* — Global IP Counselors (57) ABSTRACT

A bicycle derailleur is provided that basically includes a base member, a movable member, a chain guide, a biasing element and a rotational resistance structure. The base member is configured to be mounted to a bicycle. The movable member is movably coupled to the base member. The chain guide is pivotally coupled to the movable member to rotate around a rotational axis with respect to the movable member. The biasing element biases the chain guide in a first rotational direction around the rotational axis with respect to the movable member. The rotational resistance structure is operatively arranged between the movable member and the chain guide to frictionally provide rotational resistance to the chain guide around the rotational axis in a second rotational direction. The rotational resistance structure applies the rotational resistance at an area disposed radially outward of the biasing element with respect to the rotational axis.

23 Claims, 5 Drawing Sheets

(56) References Cited

U.S. PATENT DOCUMENTS

| | | |
|---|---|---|
| 8,025,597 B2 | 9/2011 | Takamoto |
| 8,852,041 B2 * | 10/2014 | Yamaguchi et al. ............ 474/80 |
| 2006/0035740 A1 * | 2/2006 | Lehtovaara et al. .......... 474/237 |
| 2007/0219029 A1 | 9/2007 | Turner |
| 2009/0054183 A1 * | 2/2009 | Takachi et al. ................. 474/80 |
| 2012/0083371 A1 * | 4/2012 | Yamaguchi et al. ............ 474/80 |
| 2012/0083372 A1 | 4/2012 | Yamaguchi et al. |

* cited by examiner

BICYCLE DERAILLEUR

BACKGROUND

1. Field of the Invention

This invention generally relates to a bicycle derailleur. More specifically, the present invention relates to a bicycle derailleur having a chain guide that is used for shifting a bicycle chain.

2. Background Information

A bicycle typically uses a chain drive transmission for transmitting a pedaling force to a rear wheel. The chain drive transmission of a bicycle often uses derailleurs to selectively move a chain from one of a plurality of sprockets to another for changing speeds of the bicycle. A typical derailleur has a base member, a movable member supporting a chain guide and a linkage assembly (e.g., a moving mechanism) coupled between the base member and the movable member so that the chain guide moves laterally relative to the base member.

SUMMARY

Generally, the present disclosure discloses various features of a bicycle derailleur. One feature presented in this disclosure is to provide a bicycle derailleur that includes a compact rotational resistance structure between the movable member and the chain guide to frictionally provide rotational resistance to the chain guide around a rotational axis in one direction. Another feature presented in this disclosure is to provide a bicycle derailleur that includes a compact connection between the movable member and the chain guide.

In view of the state of the known technology and in accordance with one aspect of the present invention, a bicycle derailleur is provided that basically comprises a base member, a movable member, a chain guide, a biasing element and a rotational resistance structure. The base member is configured to be mounted to a bicycle. The movable member is movably coupled to the base member. The chain guide is pivotally coupled to the movable member to rotate around a rotational axis with respect to the movable member. The biasing element biases the chain guide in a first rotational direction around the rotational axis with respect to the movable member. The rotational resistance structure is operatively arranged between the movable member and the chain guide to frictionally provide rotational resistance to the chain guide around the rotational axis in a second rotational direction. The second rotational direction is opposite to the first rotational direction. The rotational resistance structure applies the rotational resistance at an area disposed radially outward of the biasing element with respect to the rotational axis.

In accordance with a second aspect of the present invention, the bicycle derailleur according to the first aspect is configured so that the area of the rotational resistance and the biasing element overlap as viewed in a radial direction with respect to the rotational axis.

In accordance with a third aspect of the present invention, the bicycle derailleur according to the first aspect further comprises a one-way clutch operatively arranged between the rotational resistance structure and the chain guide.

In accordance with a fourth aspect of the present invention, the bicycle derailleur according to the third aspect is configured so that the one-way clutch rotates freely as the chain guide pivots around the rotational axis in the first rotational direction.

In accordance with a fifth aspect of the present invention, the bicycle derailleur according to the third aspect is configured so that the one-way clutch is disposed radially outward of the biasing element with respect to the rotational axis.

In accordance with a sixth aspect of the present invention, the bicycle derailleur according to the first aspect is configured so that the biasing element includes a torsion spring having a coiled portion extending helically around the rotational axis, a first end operatively coupled to the chain guide, and a second end operatively coupled to the movable member.

In accordance with a seventh aspect of the present invention, the bicycle derailleur according to the sixth aspect further comprises an axle fixed to the movable member, and the second end of the torsion spring being engaged with the axle, which defines the rotational axis.

In accordance with an eighth aspect of the present invention, the bicycle derailleur according to the sixth aspect further comprises an inner member fixed to the chain guide and housing the coiled portion of the torsion spring. The first end of the torsion spring being engaged with the inner member.

In accordance with a ninth aspect of the present invention, the bicycle derailleur according to the seventh aspect further comprises an inner member fixed to the chain guide and housing the coiled portion of the torsion spring. The second end of the torsion spring is engaged with the inner member.

In accordance with a tenth aspect of the present invention, the bicycle derailleur according to the third aspect is configured so that the one-way clutch includes an inner member that is fixed to the chain guide and at least partially houses the biasing element.

In accordance with an eleventh aspect of the present invention, the bicycle derailleur according to the first aspect is configured so that the biasing element includes a torsion spring having a coiled portion extending helically around the rotational axis and disposed inside the inner member, a first end operatively coupled to the inner member, and a second end operatively coupled to the movable member.

In accordance with a twelfth aspect of the present invention, the bicycle derailleur according to the eleventh aspect is configured so that the rotational resistance structure includes a first friction portion of an outer member of the one-way clutch and a second friction portion of the movable member. The first and second friction portions are in frictional contact.

In accordance with a thirteenth aspect of the present invention, a bicycle derailleur is provided that basically comprises a base member, a movable member, a chain guide and a biasing element. The base member is configured to be mounted to a bicycle. The movable member is movably coupled to the base member. The chain guide is pivotally coupled to the movable member to rotate around a rotational axis with respect to the movable member. The chain guide includes a guide pulley arranged on the rotational axis. The biasing element biases the chain guide in a first rotational direction around the rotational axis. The biasing element is at least partially disposed inside of the guide pulley.

In accordance with a fourteenth aspect of the present invention, the bicycle derailleur according to the thirteenth aspect is configured so that the biasing element includes a torsion spring having a coiled portion extending helically around the rotational axis, a first end operatively coupled to the chain guide, and a second end operatively coupled to the movable member.

In accordance with a fifteenth aspect of the present invention, the bicycle derailleur according to the fourteenth aspect is configured so that the coiled portion of the torsion spring is at least partially disposed inside of the guide pulley.

In accordance with a sixteenth aspect of the present invention, the bicycle derailleur according to the fourteenth aspect further comprises an axle fixed to the movable member, and the second end of the torsion spring being engaged with the axle, which defines the rotational axis.

In accordance with a seventeenth aspect of the present invention, the bicycle derailleur according to the sixteenth aspect further comprises an inner member fixed to the chain guide and pivotally disposed on the axle to pivot around the rotational axis. The inner member rotatably supports the guide pulley and housing the coiled portion of the torsion spring. The second end of the torsion spring is engaged with the inner member.

In accordance with an eighteenth aspect of the present invention, the bicycle derailleur according to the thirteenth aspect further comprises a rotational resistance structure. The rotational resistance structure is operatively arranged between the movable member and the chain guide to frictionally provide rotational resistance to the chain guide around the rotational axis in a second rotational direction. The second rotational direction is opposite to the first rotational direction. The rotational resistance structure applies the rotational resistance at an area disposed radially outward of the biasing element with respect to the rotational axis.

In accordance with a nineteenth aspect of the present invention, the bicycle derailleur according to the eighteenth aspect is configured so that the area of the rotational resistance and the biasing element overlap as viewed in a radial direction with respect to the rotational axis.

In accordance with a twentieth aspect of the present invention, the bicycle derailleur according to the eighteenth aspect further comprises a one-way clutch operatively arranged between the rotational resistance structure and the chain guide.

In accordance with a twenty-first aspect of the present invention, the bicycle derailleur according to the twentieth aspect is configured so that the one-way clutch rotates freely as the chain guide pivots around the rotational axis in the first rotational direction.

In accordance with a twenty-second aspect of the present invention, the bicycle derailleur according to the twentieth is configured so that the one-way clutch is disposed radially outward of the biasing element with respect to the rotational axis.

In accordance with a twenty-third aspect of the present invention, the bicycle derailleur according to the twentieth aspect is configured so that the one-way clutch includes an inner member, an outer member and at least one roller. The at least one roller is disposed between the inner member and the outer member. The inner member is fixed to the chain guide and at least partially houses the biasing element. The rotational resistance structure includes a first friction portion of the outer member of the one-way clutch and a second friction portion of the movable member. The first and second friction portions are in frictional contact.

In accordance with a twenty-fourth aspect of the present invention, the bicycle derailleur according to the twenty-third aspect is configured so that the biasing element includes a torsion spring having a coiled portion extending helically around the rotational axis and disposed inside the inner member, a first end operatively coupled to the inner member, and a second end operatively coupled to the movable member.

Other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
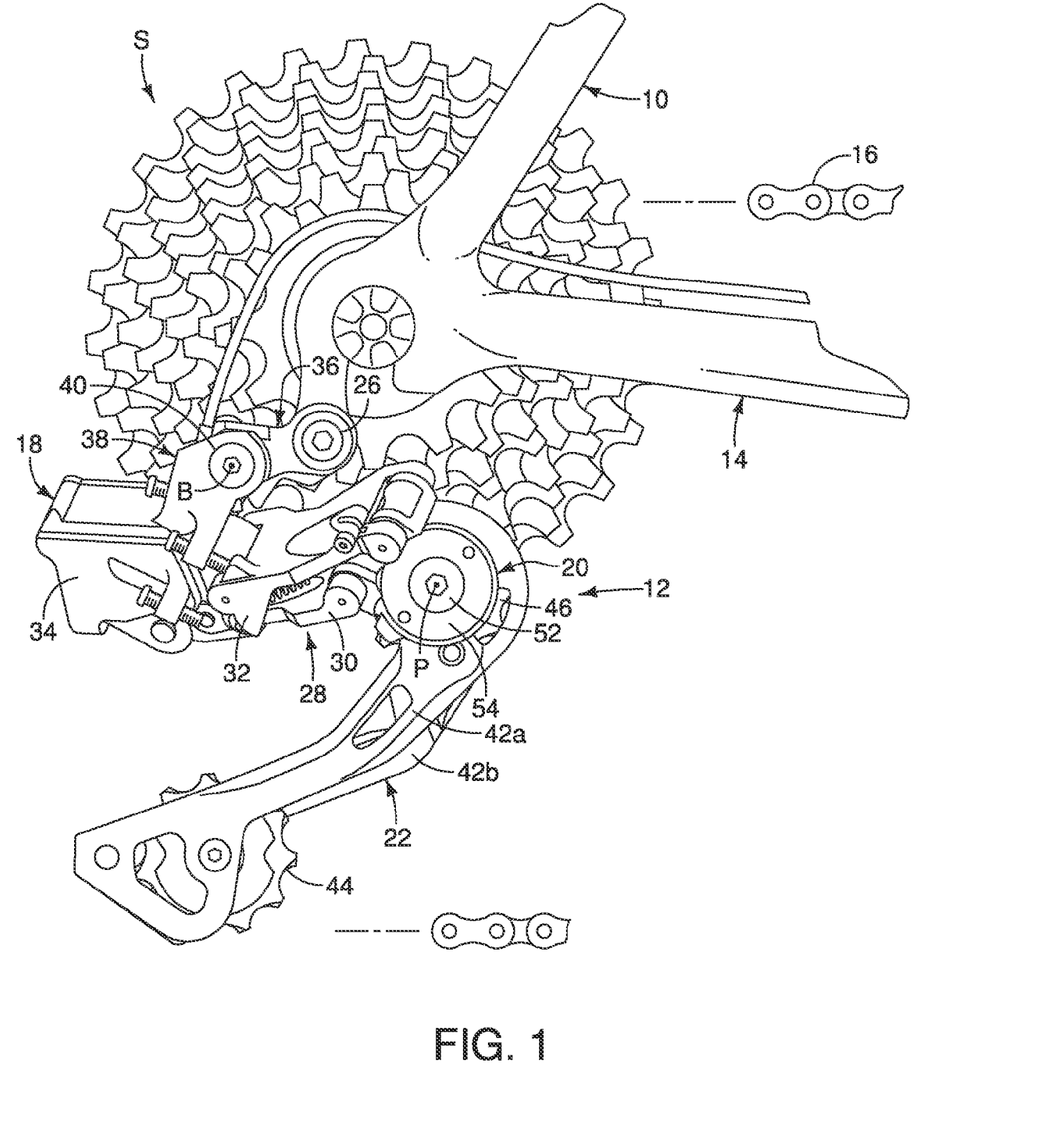
FIG. 1 is a partial side elevational view of a rear frame portion of a bicycle with a rear bicycle derailleur in a top shift stage position.

Referring initially to FIG. 1, a rear portion of a bicycle 10 is illustrated that includes, among other things, a rear bicycle derailleur 12 in accordance with an illustrated embodiment. The rear bicycle derailleur 12 will hereinafter be more simply referred to as "the rear derailleur 12". The rear derailleur 12 is secured to a rear portion of a bicycle frame 14 in a conventional manner as discussed below. The rear derailleur 12 shifts a bicycle chain 16 in a lateral direction with respect to the bicycle frame 14 between a plurality of rear sprockets S.

In particular, the rear derailleur 12 is operated by a shifter (not shown), which is a shift actuating device. The shifter operates the rear derailleur 12 between a plurality of shift stage (gear) positions such that the bicycle chain 16 is moved by the rear derailleur 12 in a lateral direction between a plurality of rear sprockets S. The rear derailleur 12 is illustrated in a top shift stage (gear) position in FIG. 1. As used herein, the term "top shift stage (gear) position" refers to the rear derailleur 12 being in an operating position that corresponds to the chain 16 being guided onto the rear sprocket S with the smallest number of teeth. As used herein, the term "low shift stage (gear) position" refers to the rear derailleur 12 being in an operating that corresponds to the chain 16 being guided onto the rear sprocket S with the largest number of teeth.

Still referring to FIG. 1, the bicycle derailleur 12 basically comprises a base member 18, a movable member 20 and a chain guide 22. The base member 18 is configured to be mounted to the bicycle 10. For example, in the illustrated embodiment, a fixing bolt 26 is used to mount the base member 18 to the bicycle frame 14. The movable member 20 is movably coupled to the base member 18. For example, in the illustrated embodiment, a linkage 28 is used to movably couple the movable member 20 to the base member 18. Here, in the illustrated embodiment, the linkage 28 includes a first or inner link 30 and a second or outer link 32. The links 30 and 32 are pivotally connected to the base member 18 and the movable member 20 to define a four bar linkage arrangement.

Here, in the illustrated embodiment, the base member 18 includes an electric motor unit 34 as seen in FIG. 1. Thus, in the illustrated embodiment, the rear derailleur 12 constitutes an electric or motorized rear derailleur. However, the rear derailleur 12 can be configured as a cable operated bicycle derailleur as needed and/or desired.

In the illustrated embodiment, the base member 18 includes a first bracket member 36 and a second bracket member 38. The first and second bracket members 36 and 38 are preferably constructed of a hard rigid material such as a lightweight metal (e.g., an aluminum alloy). The second bracket member 38 is coupled to the first bracket member 36 by a fastener 40 (e.g., a bolt). Preferably, the first member 36 and the second member 38 are pivotally coupled together by the fastener 40 about a pivot axis B that is defined by the center longitudinal axis of the fastener 40. The pivot axis B is sometimes called the B-axis of the rear derailleur. While the base member 18 is attached to the rear portion of a bicycle frame 14 using the first bracket member 36, it will be apparent from this disclosure that the second bracket member 38 can be attached directly to the rear portion of the bicycle frame 14 using the fixing bolt 26 or another fastener. The second bracket member 38 further includes a pair of shift stage adjustment screws for setting range of movement of the movable member 20 with respect to the base member 18.

As best seen in FIG. 1, the chain guide 22 basically includes an outer chain cage plate 42a, an inner chain cage plate 42b, a tension pulley 44 and a guide pulley 46. The pulleys 44 and 46 are both rotatably disposed between the chain cage plates 42a and 42b. The chain guide 22 is pivotally coupled to the movable member 20 to rotate around a rotational axis P with respect to the movable member 20. The rotational pivot axis P is sometimes called the P-axis of the rear derailleur. In the illustrated embodiment, the guide pulley 46 is the guide pulley 46 is rotatably arranged on the rotational axis P.

Figure 2:
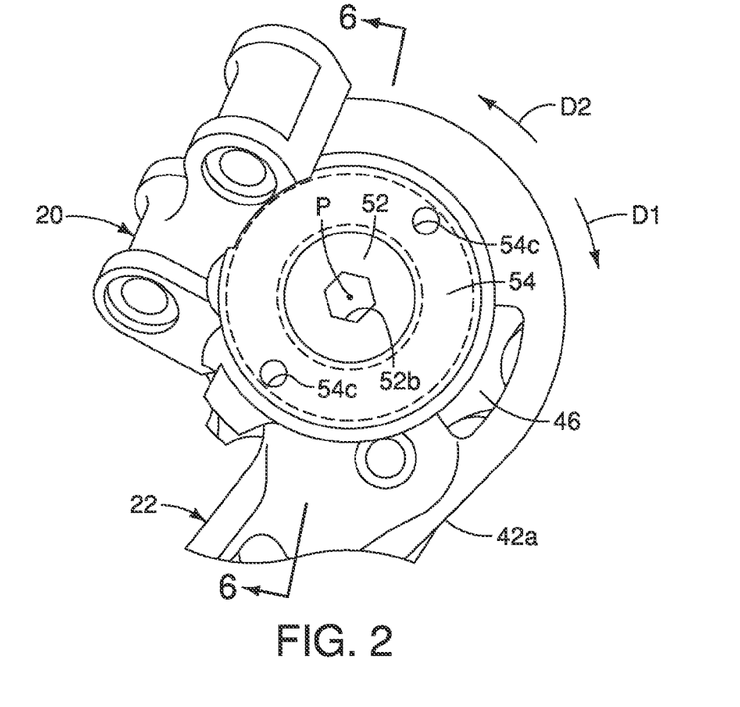
FIG. 2 is a non-frame facing side elevational view of a movable of the rear derailleur illustrated in FIG. 1 with only an upper portion of the chain guide being illustrated.
Figure 3:
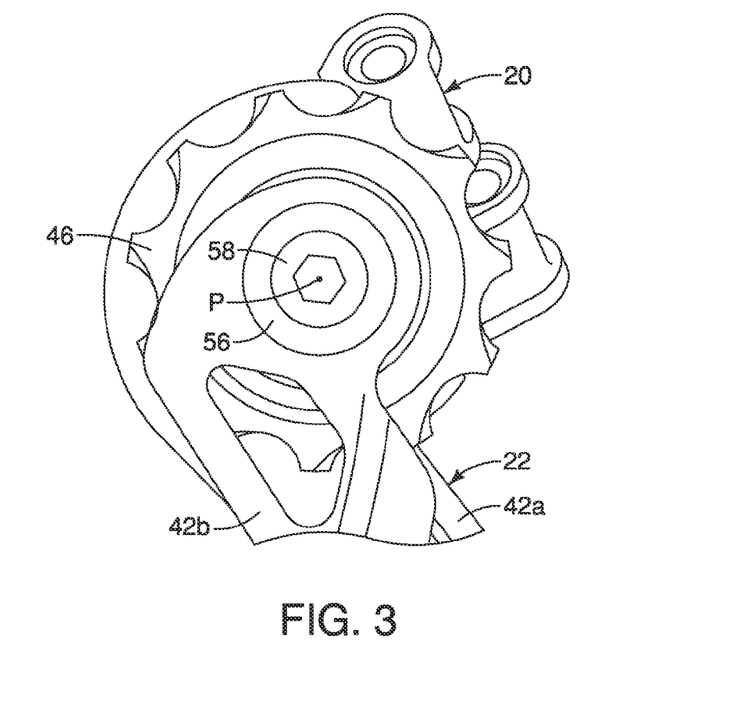
FIG. 3 is a frame facing side elevational view of the movable illustrated in FIGS. 1 and 2 with only the upper portion of the chain guide being illustrated.
Figure 4:
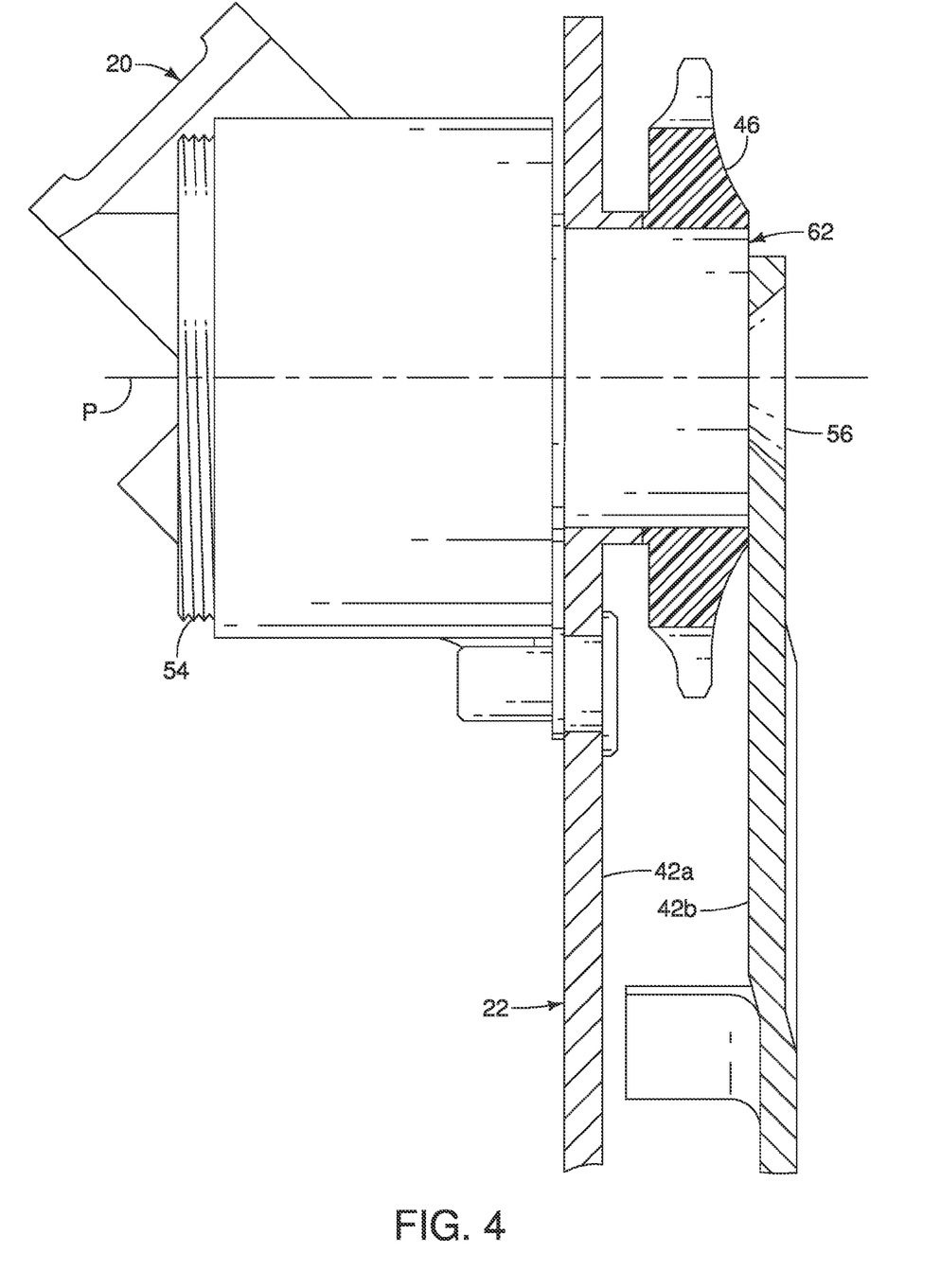
FIG. 4 is a forward facing side elevational view of the movable illustrated in FIGS. 1 to 3 with the upper portion of the chain guide and the guide pulley being illustrated in cross section.

As seen in FIGS. 2 to 6, the bicycle derailleur 12 further comprises a biasing element 50. The biasing element 50 is operatively provided between the movable member 20 and the chain guide 22 to bias the chain guide 22 with respect to the movable member 20. More specifically, the biasing element 50 biases the chain guide 22 in a first rotational direction D1 around the rotational axis P with respect to the movable member 20. Thus, as seen in FIG. 2, the first rotational direction D1 is a clockwise rotational direction of the chain guide 22 around the rotational axis P while being viewed along the rotational axis P from the non-frame facing side of the movable member 20. In this illustrated embodiment, preferably, the biasing element 50 includes a torsion spring having a coiled portion 50a, a first end 50b and a second end 50c. The coiled portion 50a extends helically around the rotational axis P. The biasing element 50 is at least partially disposed inside of the guide pulley 46. In particular, one end portion of the coiled portion 50a of the torsion spring is at least partially disposed inside of the guide pulley 46. The first end 50b is operatively coupled to the chain guide 22, while the second end 50c is operatively coupled to the movable member 20. In this way, the biasing element 50 biases the chain guide 22 in the first rotational direction D1 around the rotational axis P with respect to the movable member 20.

Figure 6:
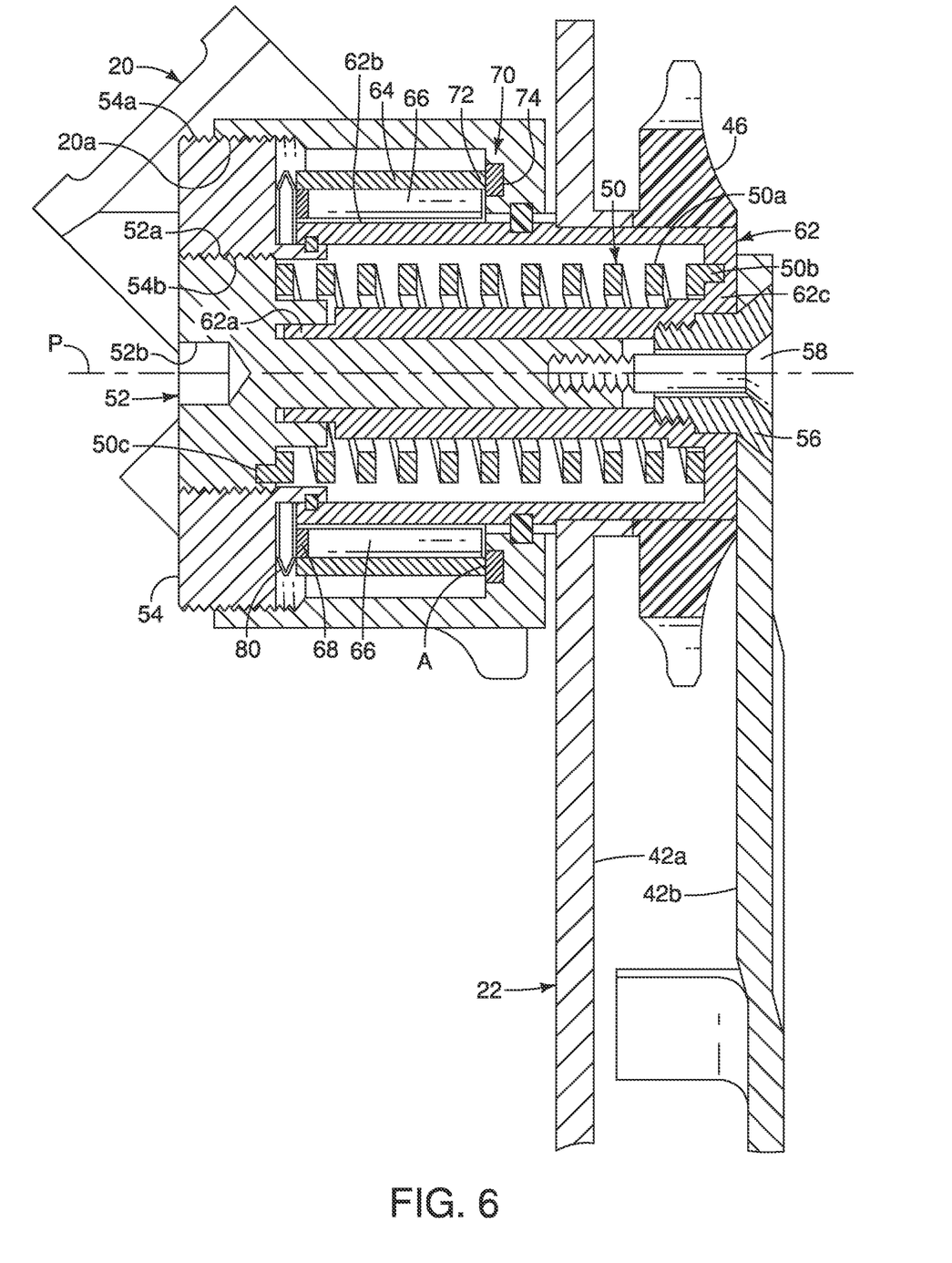
FIG. 6 is a cross sectional view of the movable of the rear derailleur illustrated in FIGS. 1 to 5 as seen along section line 6-6 in FIG. 2.

As seen in FIG. 6, the bicycle derailleur 12 further comprises an axle 52 that is fixed to the movable member 20. In particular, for example, the axle 52 is fixed to the movable member 20 by a cover member 54. The cover member 54 is preferably screwed into the movable member 20. In particular, the cover 54 has an external thread 54a, a threaded bore 54b and a pair of tool engagement portions 54c. The tool engagement portions 54c disposed on the outside end to rotate the cover 54. By rotating the cover 54, the external thread 54a of the cover member 54 engage with an internal thread 20a of the movable member 20 to attach the cover 54 to the movable member 20. The threaded bore 54b of the cover member 54 is receives the axle 52 for attaching to the movable member 20 via the cover member 54. In particular, the axle 52 has an external thread 52a that is screwed into the threaded bore 54b for fixing the axle 52 to the movable member 20 via the cover member 54. In this way, the axle 52 is attached to the cover member 52 by a screw connection. The axle 52 has a tool engagement portion 52b on the outside end to rotate the axle 52. The axle 52 defines the rotational axis P about which the chain guide 22 pivots. Thus, the chain guide 22 is pivotally coupled to the axle 52 to pivot relative to the movable member 20. Here, the chain guide 22 is pivotally mounted to the movable member 20 by a pair of bolts 56 and 58, as discussed below, or by other suitable fasteners.

Figure 5:
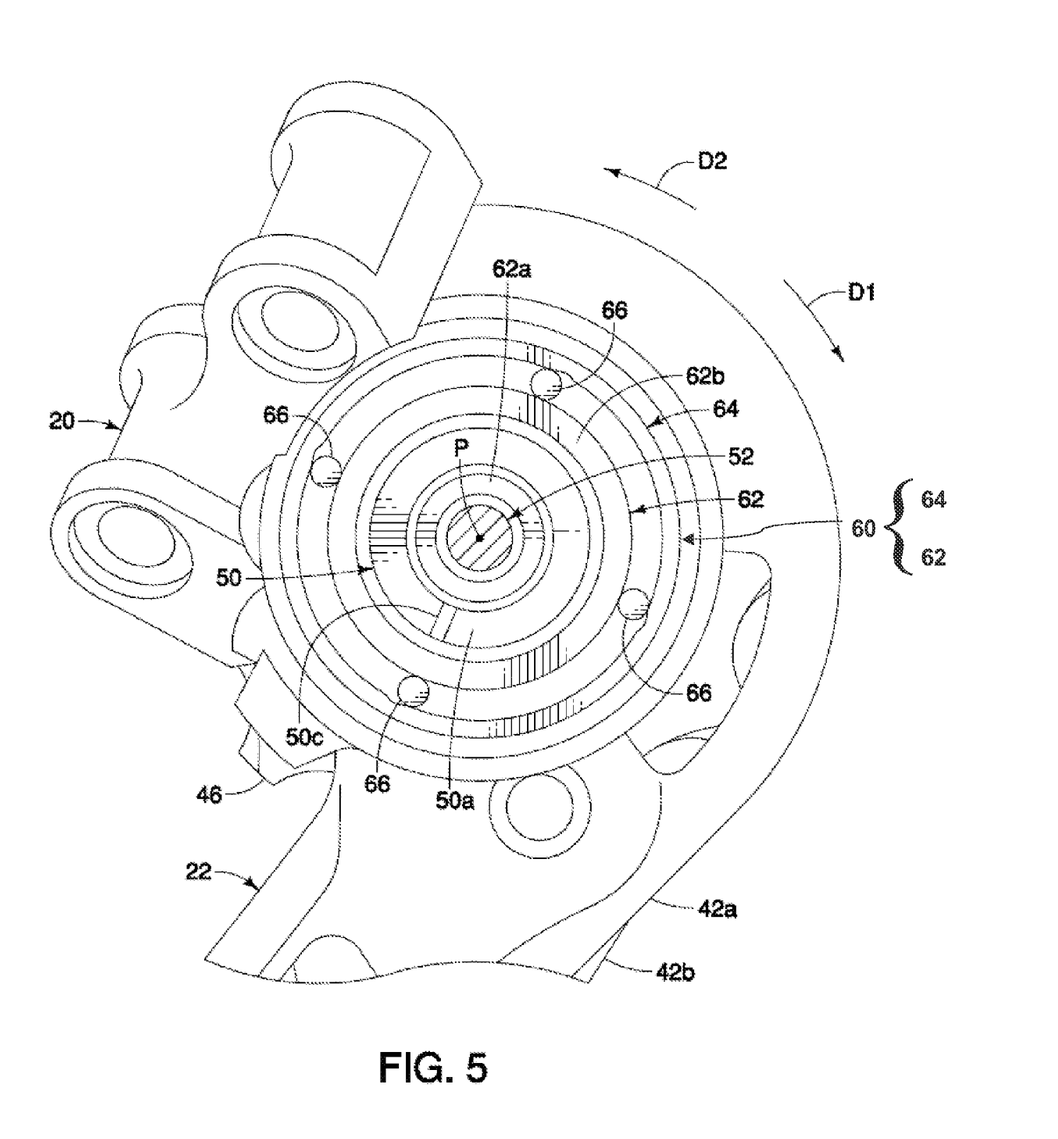
FIG. 5 is a non-frame side elevational view, similar to FIG. 2, of the movable of the rear derailleur illustrated in FIGS. 1 to 4 with a cover member, a roller holder, a friction spring and an axle remove to illustrate a relationship between a biasing element, a one-way clutch and a rotational resistance structure.

As seen in FIGS. 5 and 6, the bicycle derailleur 12 further comprises a one-way clutch 60. The one-way clutch 60 rotates freely as the chain guide 22 pivots around the rotational axis P in the first rotational direction D1. The one-way clutch 60 is disposed radially outward of the biasing element 50 with respect to the rotational axis P. Basically, the one-way clutch 60 includes an inner member 62, an outer member 64 and at least one roller 66. Preferably, the one-way clutch 60 is a roller clutch, which has a plurality of the rollers 66 (e.g., four rollers as shown). The rollers 66 are spaced apart and held in position by a roller holder 68. The roller holder 68 maintains the rollers 66 in a non-engaged position when the axle 52 is rotated to the first rotational direction D1. The rollers 66 are disposed between the inner member 62 and the outer member 64 such that the inner member 62 moves relative to the outer member 64 as the chain guide 22 pivots with respect to the movable member 20 around the rotational axis P.

As seen in FIG. 6, the inner member 62 is fixed to the chain guide 22 such that pivotal movement of the chain guide 22 turns inner member 62. In particular, for example, the bolt 56 rigidly fixes the inner member 62 to the chain guide 22, while the bolt 58 pass through a center bore of the bolt 56 and is screwed into the inner end of the axle 52. The bolt 58 prevents the relative axially movement between the inner member 62 and the axle 52. In this embodiment, the outer chain cage plate 42a is pressed into the outer surface of the inner member 62 and the inner chain cage plate 42b is fixed to the inner end portion of the inner member 62 by the bolt 56.

Preferably, the inner member 62 at least partially houses the biasing element 50. The coiled portion 50a is disposed inside the inner member 62. In other words, the inner member 62 houses the coiled portion 50a of the torsion spring. Also the first end 50b of the biasing element 50 is engaged with the inner member 62. Here, in the illustrated embodiment, the inner member 62 has an inner tubular portion 62a and an outer tubular portion 62b. The inner tubular portion 62a is connected to the outer tubular portion 62b by an end wall 62c. The inner tubular portion 62a of the inner member 62 is pivotally disposed on the axle 52 to pivot around the rotational axis P. The outer tubular portion 62b of the inner member 62 rotatably supports the guide pulley 46. A bearing member may be disposed between the inner member 62 and the guide pulley 46 as needed and/or desired.

The first end 50b of the biasing element 50 (i.e., the torsion spring) is coupled to the inner member 62, while the second end 50c of the biasing element 50 (i.e., the torsion spring) is engaged with the axle 52. In particular, the first end 50b of the biasing element 50 is disposed in an opening of the end wall 62c of the inner member 62, and the second end 50c of the biasing element 50 is disposed in an opening of an end wall of the axle 52. While the first end 50b of the biasing element 50 is directed engaged with the inner member 62, it will be apparent from this disclosure that the first end 50b can be operatively coupled to the inner member 62 via an intermediate member as needed and/or desired. Similarly, while the second end 50c of the biasing element 50 is directed engaged with the axle 52, it will be apparent from this disclosure that the second end 50c can be directly engaged with the movable member 20. In any case, the first end 50b is operatively coupled to the inner member 62 and the second end 50b is operatively coupled to the movable member 20.

As seen in FIG. 6, in the illustrated embodiment, the bicycle derailleur 12 further comprises a rotational resistance structure 70. The rotational resistance structure 70 is operatively arranged between the movable member 20 and the chain guide 22 to frictionally provide rotational resistance to the chain guide 22 around the rotational axis P in a second rotational direction D2. In other words, the rotational resistance structure 70 applies resistance to the rotational movement of the chain guide 22 in the second rotational direction D2 with respect to the movable member 20. In particular, the rotational resistance structure 70 applies frictional resistance to rotational movement of the chain guide 22 by applying frictional resistance to the rotation of one-way clutch 60. As mentioned above, the one-way clutch 60 allows the chain guide 22 to freely pivot around the rotational axis P in the first rotational direction D1, but locks up when rotated in the second rotational direction D2. The second rotational direction D2 is opposite to the first rotational direction D1 in which the chain guide 22 is biased by the biasing element 50. Thus, in the illustrated embodiment, the one-way clutch 60 is operatively arranged between the rotational resistance structure 70 and the chain guide 22.

Now the particular structure of the rotational resistance structure 70 will be discussed with reference to FIGS. 5 and 6. In the illustrated embodiment, the rotational resistance structure 70 includes a first friction portion 72 that is part of the outer member 64 of the one-way clutch 60 and a second friction portion 74 that is part of the movable member 20. The first and second friction portions 72 and 74 are in frictional contact. In the illustrated embodiment, a biasing element 80 is disposed between the cover member 54 of the movable member 20 and an axial end of the outer member 64. The biasing element 80 pushes the first friction portion 72 (i.e., the opposite axial face) of the outer member 64 into frictional contact with the second friction portion 74 of the movable member 20. Preferably, as in the illustrated embodiment, the rotational resistance structure 70 is adjustable to vary the rotational resistance between the first and second friction portions 72 and 74. In particular, the rotational resistance is varied by screwing the cover member 54 into or out of the movable member 20. The second friction portion 74 can be made by resin or material like a brake shoe for a disc brake. The biasing element 80 can be made by a coil spring or a plate spring. The cover 54 can contact the outer member 64 directly without the biasing element 80.

While the outer member 64 and the first friction portion 72 are formed as a one-piece, unitary member in the illustrated embodiment, it will be apparent from this disclosure that the first friction portion 72 can be a separate member that is attached to the outer member 64. Also while the second friction portion 74 is illustrated as a separate member from the movable member 20, it will be apparent from this disclosure that the second friction portion 74 can be formed by a surface of the movable member 20. In other words, the second friction portion 74 does not need to be a separate member that is fixed to the movable member 20.

Basically, the rotational resistance structure 70 applies the rotational resistance at an area A that is disposed radially outward of the biasing element 50 with respect to the rotational axis P. In the illustrated embodiment, the area A of the rotational resistance is an annular area that is disposed around the rotational axis P. The area A of the rotational resistance is where the first and second friction portions 72 and 74 are in frictional contact. In the illustrated embodiment, the area A of the rotational resistance and the biasing element 50 overlap as viewed in a radial direction with respect to the rotational axis P.

Basically, the rotational resistance structure 70 increases an operation energy of the electric motor unit 34 as the electric motor unit 34 moves the movable member 20 toward the low shift stage position with respect to the base member 18. Since resistance applying elements and one-way clutches similar to the rotational resistance structure 70 and the one-way clutch 104 are discussed in detail in U.S. Patent Application Publication No. 2012/0083371, the rotational resistance structure 70 and the one-way clutch 60 will not be discussed in further detail herein.

Moreover, the rotational resistance structure 70 is not limited to the illustrated embodiment. For example, the area A of the rotational resistance can be provided along the outer circumferential surface of the outer member 64 instead of, or in addition to, being provided on the axial end face of the outer member 64 as illustrated. Moreover, when the area A of the rotational resistance is provided along the outer circumferential surface of the outer member 64, the outer circumferential surface can be tapered to mate with a corresponding tapered surface formed on the interior surface of the movable member 20. In this way, the rotational resistance can be varied by screwing the cover member 54 into or out of the movable member 20.

The term "connect" or "connected", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e. one element is unitary part of the other element. For example, the magnetized part can be directly secured to the crank arm attachment part, or can be indirectly secured to the crank arm attachment part through intermediate member(s), or can be integral with the crank arm attachment part. This definition also applies to words of similar meaning, for example, the terms "attach", "attached", "join", "joined", "fix", "fixed", "bond", "bonded", "couple", "coupled" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
a base member configured to be mounted to a bicycle;
a movable member movably coupled to the base member;
a chain guide pivotally coupled to the movable member to rotate around a rotational axis with respect to the movable member, the chain guide including a guide pulley rotatably arranged on the rotational axis;
a biasing element biasing the chain guide in a first rotational direction around the rotational axis, the biasing element being at least partially disposed inside of the guide pulley;
an inner member that is fixed to the chain guide and configured to rotatably support the guide pulley and at least partially house the biasing element, the inner member including an inner tubular portion, an outer tubular portion disposed radially spaced apart from the inner tubular portion, and an end wall that connects the inner tubular portion to the outer tubular portion;
a rotational resistance structure operatively arranged between the movable member and the chain guide to frictionally provide rotational resistance to the chain guide around the rotational axis in a second rotational direction which is opposite to the first rotational direction, the rotational resistance structure applying the rotational resistance at an area disposed radially outward of the biasing element with respect to the rotational axis; and
a one-way clutch operatively arranged between the rotational resistance structure and the chain guide,
the one-way clutch allows the chain guide to pivot around the rotational axis in the first rotational direction, and the one-way clutch locks up when the chain guide pivots in the second rotational direction with respect to the movable member.

2. A bicycle derailleur comprising:
a base member configured to be mounted to a bicycle;
a movable member movably coupled to the base member;
a chain guide pivotally coupled to the movable member to rotate around a rotational axis with respect to the movable member;
a biasing element biasing the chain guide in a first rotational direction around the rotational axis with respect to the movable member;
a rotational resistance structure operatively arranged between the movable member and the chain guide to frictionally provide rotational resistance to the chain guide around the rotational axis in a second rotational direction, which is opposite to the first rotational direction, the rotational resistance structure including a first friction portion and a second friction portion disposed radially outward of the biasing element with respect to the rotational axis, the rotational resistance structure applying the rotational resistance between the first friction portion and the second friction portion; and
a one-way clutch operatively arranged between the rotational resistance structure and the chain guide such that the one-way clutch locks the chain guide to be non-rotatable with respect to the first friction portion in a locked state of the one-way clutch, and allows rotation of the chain guide with respect to the first friction in an unlocked state of the one-way clutch.

3. The bicycle derailleur according to claim 2, wherein the first and second friction portions of the rotational resistance structure and the biasing element overlap as viewed in a radial direction with respect to the rotational axis.

4. The bicycle derailleur according to claim 2, wherein the one-way clutch allows the chain guide to pivot with respect to the first friction portion around the rotational axis in the first rotational direction, and the one-way clutch locks the chain guide with respect to the first friction portion when the chain guide pivots in the second rotational direction with respect to the movable member.

5. The bicycle derailleur according to claim 2, wherein the one-way clutch is disposed radially outward of the biasing element with respect to the rotational axis.

6. The bicycle derailleur according to claim 2, wherein the biasing element includes a torsion spring having a coiled portion extending helically around the rotational axis, a first end operatively coupled to the chain guide, and a second end operatively coupled to the movable member.

7. The bicycle derailleur according to claim 6, further comprising
an axle fixed to the movable member, and the second end of the torsion spring being engaged with the axle, which defines the rotational axis.

8. The bicycle derailleur according to claim 7, further comprising
an inner member fixed to the chain guide and housing the coiled portion of the torsion spring, and the first end of the torsion spring being engaged with the inner member.

9. The bicycle derailleur according to claim 6, further comprising
an inner member fixed to the chain guide and housing the coiled portion of the torsion spring, and the first end of the torsion spring being engaged with the inner member.

10. The bicycle derailleur according to claim 2, wherein the one-way clutch includes an inner member that is fixed to the chain guide and at least partially houses the biasing element.

11. The bicycle derailleur according to claim 10, wherein the biasing element includes a torsion spring having a coiled portion extending helically around the rotational axis and disposed inside the inner member, a first end operatively coupled to the inner member, and a second end operatively coupled to the movable member.

12. The bicycle derailleur according to claim 10, wherein the first friction portion is provided on an outer member of the one-way clutch and the second friction portion is provided on the movable member, the first and second friction portions being in frictional contact.

13. A bicycle derailleur comprising:
a base member configured to be mounted to a bicycle;
a movable member movably coupled to the base member;
a chain guide pivotally coupled to the movable member to rotate around a rotational axis with respect to the movable member, the chain guide including a guide pulley rotatably arranged on the rotational axis;

a biasing element biasing the chain guide in a first rotational direction around the rotational axis, the biasing element being at least partially disposed inside of the guide pulley; and an inner member that is fixed to the chain guide and configured to rotatably support the guide pulley and at least partially house the biasing element, the inner member including an inner tubular portion, an outer tubular portion disposed radially spaced apart from the inner tubular portion, and an end wall that non-rotatably connects the inner tubular portion to the outer tubular portion.

14. The bicycle derailleur according to claim 13, wherein the biasing element includes a torsion spring having a coiled portion extending helically around the rotational axis, a first end operatively coupled to the chain guide, and a second end operatively coupled to the movable member.

15. The bicycle derailleur according to claim 14, wherein the coiled portion of the torsion spring is at least partially disposed inside of the guide pulley.

16. The bicycle derailleur according to claim 14, further comprising
an axle fixed to the movable member, and the second end of the torsion spring being engaged with the axle, which defines the rotational axis.

17. The bicycle derailleur according to claim 16, wherein the inner tubular portion of the inner member is pivotally disposed on the axle to pivot around the rotational axis, the coiled portion of the torsion spring being disposed between the inner tubular portion and the outer tubular portion, and the first end of the torsion spring being engaged with the inner member.

18. The bicycle derailleur according to claim 13, further comprising
a rotational resistance structure being operatively arranged between the movable member and the chain guide to frictionally provide rotational resistance to the chain guide around the rotational axis in a second rotational direction, which is opposite to the first rotational direction, the rotational resistance structure applying the rotational resistance at an area disposed radially outward of the biasing element with respect to the rotational axis.

19. The bicycle derailleur according to claim 18, wherein the area of the rotational resistance and the biasing element overlap as viewed in a radial direction with respect to the rotational axis.

20. The bicycle derailleur according to claim 18, further comprising
a one-way clutch operatively arranged between the rotational resistance structure and the chain guide.

21. The bicycle derailleur according to claim 20, wherein the one-way clutch is disposed radially outward of the biasing element with respect to the rotational axis.

22. The bicycle derailleur according to claim 20, wherein the one-way clutch includes the inner member, an outer member and at least one roller, the at least one roller being disposed between the inner member and the outer member, the inner member being fixed to the chain guide and at least partially housing the biasing element, and
the rotational resistance structure includes a first friction portion of the outer member of the one-way clutch and a second friction portion of the movable member, the first and second friction portions being in frictional contact.

23. The bicycle derailleur according to claim 22, wherein the biasing element includes a torsion spring having a coiled portion extending helically around the rotational axis and disposed inside the inner member, a first end operatively coupled to the inner member, and a second end operatively coupled to the movable member.

* * * * *